(12) United States Patent
Ginsberg

(10) Patent No.: US 6,994,891 B2
(45) Date of Patent: Feb. 7, 2006

(54) METHOD FOR PRODUCING AN EPOXY COMPOSITION

(76) Inventor: Murray Ginsberg, 1180 NW. 163rd Dr., Miami, FL (US) 33168

(*) Notice: Subject to any disclaimer, the term of this patent is extended or adjusted under 35 U.S.C. 154(b) by 0 days.

(21) Appl. No.: 10/867,293

(22) Filed: Jun. 14, 2004

(65) Prior Publication Data

US 2005/0276926 A1    Dec. 15, 2005

(51) Int. Cl.
*B05D 1/02* (2006.01)
*C08K 3/10* (2006.01)
*C08L 63/00* (2006.01)
*C08L 83/04* (2006.01)

(52) U.S. Cl. .................. 427/421.1; 523/457; 523/459; 525/476

(58) Field of Classification Search ............... 523/400, 523/457, 459; 525/476
See application file for complete search history.

(56) References Cited

U.S. PATENT DOCUMENTS 4,558,077 A * 12/1985 Gray ..................... 252/62.54
4,762,864 A *  8/1988 Goel et al. ................. 523/428
4,874,548 A * 10/1989 Hajovsky .................. 252/511
2002/0177027 A1 * 11/2002 Yeager et al. ................. 429/34
2004/0144960 A1 *  7/2004 Arai et al. .................. 252/500

FOREIGN PATENT DOCUMENTS

JP          58-074773      *    5/1983

OTHER PUBLICATIONS

English Abstract of JP 58-074773, Osamu et al., May 6, 1983.*

* cited by examiner

*Primary Examiner*—Michael J. Feely
(74) *Attorney, Agent, or Firm*—D'Ambrosio & Associates, P.L.L.C.

(57) ABSTRACT

An epoxy composition for application to the surface of a marine vessel. The epoxy composition comprises an epoxy resin and an iron particulate combined with one or more materials, preferably dry materials, which are piped into a feeder and then into a mixer. The dry materials are selected from a group of one or more additives comprising a ceramic material, an amorphous fumed silica such as Cab-O-Sil®, a silicone and a color pigment. The combined mixture is then submitted to a polarizing process so that the iron particulate is magnetized to create a polarized, electromagnetic field.

A second mixture comprising an epoxy hardener, a ceramic material and an amorphous fumed silica is produced for ultimately combining with the epoxy resin mixture at the point of application to the marine vessel.

27 Claims, 1 Drawing Sheet

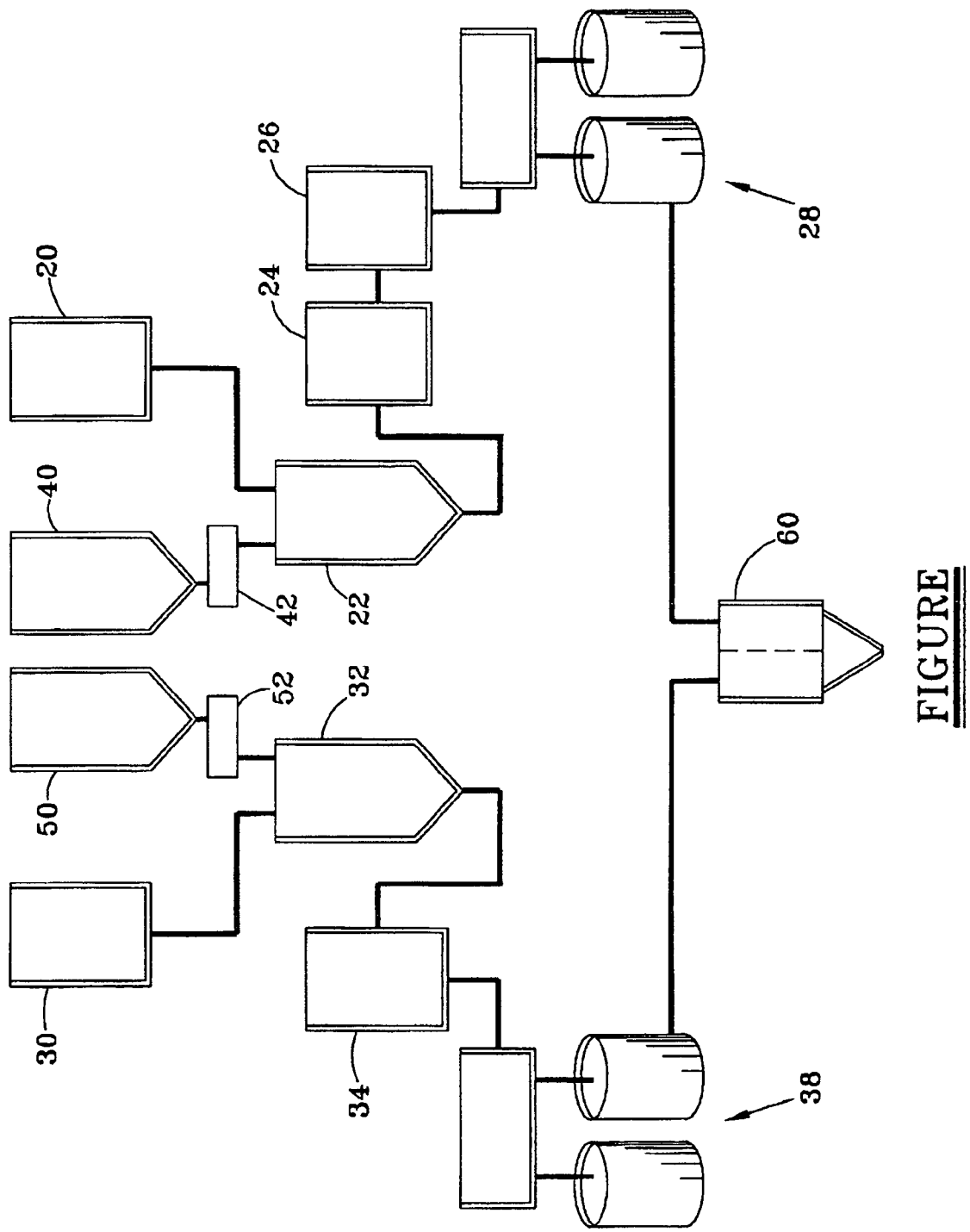

METHOD FOR PRODUCING AN EPOXY COMPOSITION

FIELD OF THE INVENTION

The present invention is directed to an epoxy composition for marine applications and the method for producing the epoxy composition. Particularly, an epoxy composition comprising a magnetized iron.

BACKGROUND OF THE INVENTION

Paint and other coatings for marine vessels and structures such as boat and ship bottoms, decks, hulls and off shore rigs are subjected to the corrosive effects of salt water and marine life, coral and barnacles for example, when immersed in sea water. Because of the negative effects of sea water, the marine vessels must be scraped and repainted or coated frequently, costing the loss of time and money as the vessels are pulled out of service for refurbishing.

Le Ruyet et al., U.S. Pat. No. 4,086,098, disclose a composition of matter comprising cellular aggregate distributed in a hardenable or hardened binder in which the aggregate consists of cellular glass beads.

Burge et al. U.S. Pat. No. 4,686,252, disclose a process for preparing a building and/or construction material, a polymer modified aqueous dispersion, and its use thereof for the preparation of building materials. The process comprises admixing a stable aqueous dispersion containing a non-curing mixture of amorphous silicon dioxide and at least one polymer, with at least one inorganic binder.

Ginsberg, in U.S. Pat. No. 6,110,996, hereby incorporated as if reproduced in its entirety, discloses a building composition and method of preventing corrosion, the composition having ceramic-like qualities of durability and thermal insulation to be used as a coating over existing building materials using an epoxy composition.

SUMMARY OF THE INVENTION

A primary object of the present invention is to provide a composition and method of producing the lightweight, high strength composition for use in the coating of marine vessels and structures, ships, smaller boats, and oil rigs for example, that are subjected to corrosion and barnacle build-up when immersed in sea water for a period of time.

It is a further object of the present invention to provide a lightweight, high strength epoxy composition which produces an electromagnetic field to reduce the build-up of marine life onto the surface of the vessel. The mixture of two unique epoxy materials, magnetized to produce a polarized, electromagnetic field, results in a composition that exhibits the physical properties of corrosion-resistance, durability and anti-fouling (from barnacles and corals) when applied to marine surfaces.

The present invention resides, in part, in the surprising realization that combining epoxy resin with ceramic materials and an iron particulate that is then magnetized, produces the ceramic-like qualities of strength, hardness, durability, waterproofing for marine surfaces as well as repelling sea life. One embodiment of the present invention comprises a first mixture having an epoxy resin, a ceramic material, a carbosil, a silicone, and an iron particulate, the iron particulate magnetized to create a polarized, electromagnetic field. The inventive composition also comprises a second mixture to be combined with the first mixture, the second mixture preferably comprising an epoxy hardener.

In one embodiment, the epoxy resin further comprises a color pigment. A preferred epoxy resin can comprise epichlordin bisphenol and a preferred epoxy hardener comprises jaffeine phenol. The iron particulate can comprise ferrite iron in the form of a powder.

An alternative epoxy composition for marine applications comprises a first mixture comprising an epoxy resin, a ceramic material, a carbosil, a silicone, and iron particulate, the iron particulate magnetized to create a polarized, electromagnetic field, the first mixture in combination with a second mixture, the second mixture comprising an epoxy hardener, a ceramic material and a carbosil. In another aspect of this invention, the epoxy resin comprises from about 55% to 65% by weight of the composition.

In one preferred method for producing an epoxy composition, an epoxy resin is mixed with a ceramic material, a carbosil, and a silicone. Iron particulate, such as ferrite iron is added to the mixture and an electro-magnetic coil is activated within the mixture resulting so that the ferrite iron particulate is magnetized to create a polarized, electromagnetic field within the mixture. In a separate tank, an epoxy hardener can be mixed with a ceramic material and a carbosil. In one preferred method, the epoxy resin, ceramic material, carbosil, and silicone are mixed in a first mixing tank and then added to a second mixing tank, the second mixing tank comprising a color pigment and the iron particulate, the second tank further comprising means for polarizing the iron particulate. Preferably, the polarized epoxy resin mixture is combined with the epoxy hardener mixture and applied to a marine vessel. The mixing of the polarized epoxy resin mixture with the epoxy hardener mixture can be performed within a polarized spray system. The combined mixture of the polarized epoxy resin mixture and the epoxy hardener mixture can be cured by heating to at least 150° F. before applying to the marine vessel.

BRIEF DESCRIPTION OF FIGURE

The FIGURE is a schematic of the method of the present invention.

DETAILED DESCRIPTION

The present invention is directed to a composition and method of producing the lightweight, high strength composition for use in the coating of marine vessels and structures, ships, smaller boats, and oil rigs for example, that are subjected to corrosion and barnacle build-up when immersed in sea water for a period of time. The lightweight, high strength epoxy composition produces an electromagnetic field to reduce the build-up of marine life onto the surface of the vessel. The mixture of two unique epoxy materials, magnetized to produce a polarized, electromagnetic field, results in a composition that exhibits the physical properties of corrosion-resistance, durability and anti-fouling (from barnacles and corals) when applied to marine surfaces.

Referring to the FIGURE, an epoxy resin, preferably in liquid form, 20, is sent to a mixer 22 to be combined with one or more materials, preferably dry materials 40, which are piped into a feeder 42 and then into the mixer 22. The dry materials may be selected from a group of one or more additives selected from a group of additives, the group comprising a ceramic material, a carbosil, a silicone, a color pigment and ferrite iron particulate. The combined mixture is then submitted to a polarizing process, preferably in a second tank 24 so that the ferrite iron particulate is magnetized to create a polarized, electromagnetic field. The color pigment may be added to this second tank 24 during the polarizing process. In one preferred embodiment, the epoxy resin comprises epichlordin bisphenol. The ferrite iron particulate can comprise ferrite iron powder, preferably, strantium ferrite.

A second mixture is produced for ultimately combining with the first mixture at the point of application to the marine vessel. The second mixture comprises an epoxy hardener 30. In one aspect, the epoxy hardener comprises jaffeine phenol. The epoxy hardener 30 can be combined with one or more additives 50 selected from a group of additives, the group comprising a ceramic material, a carbosil, a silicone, a color pigment and iron particulate, the iron particulate magnetized to create a polarized, electromagnetic field.

Another preferred epoxy composition for marine applications comprises a first mixture comprising an epoxy resin, a ceramic material, a carbosil, a silicone, and ferrite iron particulate, the ferrite iron particulate magnetized to create a polarized, electro-magnetic field. The first mixture is combined on site of application with a second mixture, the second mixture comprising an epoxy hardener, a ceramic material and a carbosil. In preferred epoxy compositions for marine application, the epoxy resin comprises from about 55% to about 65% by weight of the composition, the ceramic material in the first mixture comprises from about 15% to about 25% by weight, the silicone comprises from about 10% to about 20% by weight, the carbosil in the first mixture comprises about 10% to about 20% by weight, the ferrite iron particulate comprises from about 2% to about 8% by weight, a color pigment comprising from about 1% to about 5% by weight and the epoxy hardener comprises from about 40% to about 60% by weight, the ceramic material in the second mixture comprises from about 25% to about 35% by weight, and the carbosil in the second mixture comprises about 15% to about 25% by weight.

In another alternative embodiment, a preferred ratio of the first mixture to the second mixture is 2:1. The combination of the first mixture and the second mixture when applied to a marine surface is a cured combination, the curing resulting from heating the combination of the epoxy resin mixture and the epoxy hardener mixture to at least 150° F.

Referring to the FIGURE, one preferred method for producing an epoxy composition comprises mixing a first mixture comprising an epoxy resin from tank A, 20, with dry materials 40. The dry materials 40 can be selected from a ceramic material, a carbosil, and a silicone. Iron particulate, such as ferrite iron is preferably included with the dry materials 40 and passed through a feeder 42 to a mixing tank 22 to be mixed with the epoxy resin. The resulting mixture is sent to another tank 24 and submitted to a polarizing process by activating an electromagnetic coil within the epoxy resin mixture so that the ferrite iron particulate is magnetized to create a polarized, electro-magnetic field within the mixture. The polarized epoxy resin mixture is then sent to a storage tank 26 and then poured into drums 28 for transport to sites for marine application.

In another preferred method for producing an epoxy resin mixture, the epoxy resin, ceramic material, carbosil, and silicone are mixed in a first mixing tank 22, preferably a centrifugal mixing tank, and than added to a second mixing tank 24, the second mixing tank comprising a color pigment and the ferrite iron particulate, the second tank further comprises means for polarizing the ferrite iron particulate, an electromagnetic coil for example.

One preferred method of producing an epoxy hardener comprises mixing, within a separate tank 32, an epoxy hardener from a storage tank 30 with one or more additives from a second tank 50 containing dry materials, the additives selected from a group of additives comprising a ceramic material, a carbosil, a silicone, a color pigment and ferrite iron particulate, the ferrite iron particulate magnetized to create a polarized, electromagnetic field. The dry materials from tank 50 are passed through a feeder 52 and fed into the mixer 32, preferably a centrifugal mixer and then piped into a storage tank 34 for filling into storage drums 38. The drums 28, 38 can then be transported to the application sites for applying to marine surfaces. Alternatively, an epoxy hardener from a first tank 30 is mixed with a ceramic material and carbosil from a second tank 50 in a centrifugal mixer 32.

Upon application to a surface of a marine vessel, the epoxy resin mixture is combined with the epoxy hardener mixture, mixing the combined epoxy resin mixture and the epoxy hardener mixture and the resulting mixed combination is applied to a marine vessel. Preferably the epoxy resin mixture is a magnetically polarized mixture. Alternatively, the epoxy hardener mixture is magnetically polarized. In one aspect of this invention, the mixture of the polarized epoxy resin mixture from drums 28 is combined with the epoxy hardener from drums 38 within a polarezed spray system 60 as known in the art. The combined mixture of the epoxy resin mixture and the epoxy hardener mixture can be cured, preferably within a spray system 60 comprising a heating coil, by heating to at least 150° F.

In another preferred method for producing an epoxy composition, the method comprises mixing an epoxy resin, a ceramic material, a carbosil, and a silicone in a mixing tank 22 using a centrifugal mixer, transferring the resulting mixture to a second tank, mixing the epoxy resin mixture with ferrite iron particulate within the second tank and continuing to mix with a centrifugal mixture. Simultaneously, an electro-magnetic coil is activated within the second tank 24 so that the ferrite iron particulate is magnetized to create a polarized, electromagnetic field within the mixture. In this embodiment, an epoxy hardener is mixed with a ceramic material and carbosil within a third mixer 32. The epoxy resin mixture and epoxy hardener mixture are stored in separate drums until ready for application onto a surface of a marine vessel. Upon application, the magnetically polarized epoxy resin mixture is combined with the epoxy hardener mixture and mixed thoroughly before applying the resulting mixed combination to the surface of a marine vessel. In one aspect, the ratio of the epoxy resin mixture to the epoxy hardener mixture is 2:1.

One preferred method further comprises the step of curing the combined epoxy resin mixture and epoxy hardener mixture by heating before application to a marine surface. The epoxy resin mixture and the epoxy hardener mixture can be combined, mixed, cured and applied by a spray system.

EXAMPLE

Test 1

On 4 Dec. 2003, a plate of carbon steel, such as used in the fabrication of ships, coated with the epoxy composition was fixed to a piling in the Bear Cut area of north Biscayne Bay, Fla. at a depth of approximately 12 to 14 feet. This location was chosen as it is an area well known for submerged objects to become encrusted with barnacles. A first inspection by divers on 21 Dec. 2003 revealed no marine growth on the plate. On 6 Feb. 2004 divers again inspected the plate, this time discovering what appeared to be an algal type growth surrounding, but not on the plate, and no evidence of barnacle growth was present. Color photographs were taken of the plate during this inspection.

The foregoing embodiments of the invention, and variations in the amounts, size, shape, materials and other details will become apparent to those skilled in the art. It is intended that all such variations and modifications which fall within the scope or spirit of the appended claims be embraced thereby.

What is claimed is:

1. An epoxy composition comprising:
   a first mixture comprising an epoxy resin, a ceramic material, an amorphous fumed silica, a silicone, and iron particulate, the iron particulate magnetized to create a polarized, electromagnetic field;
   a second mixture for combining with the first mixture, the second mixture comprising an epoxy hardener.

2. The epoxy composition of claim 1 wherein the epoxy resin further comprises a color pigment.

3. The epoxy composition of claim 1 wherein the epoxy resin comprises epichlorohydrin bisphenol.

4. The epoxy composition of claim 1 wherein the iron particulate comprises ferrite iron powder.

5. An epoxy composition for marine applications comprising:
   a first mixture comprising an epoxy resin, a ceramic material, an amorphous fumed silica, a silicone, and iron particulate, the iron particulate magnetized to create a polarized, electro-magnetic field,
   the first mixture in combination with a second mixture, the second mixture comprising an epoxy hardener, a ceramic material and an amorphous fumed silica.

6. The epoxy composition of claim 5 wherein the epoxy resin comprises from about 55% to about 65% by weight of the first mixture, the ceramic material in the first mixture comprises from about 15% to about 25% by weight of the first mixture, the silicone comprises from about 10% to about 20% by weight of the first mixture, the amorphous fumed silica in the first mixture comprises about 10% to 20% by weight of the first mixture, the iron particulate comprises from about 2% to about 8% by weight of the first mixture, a color pigment comprising from about 1% to about 5% by weight of the first mixture and the epoxy hardener comprises from about 40% to about 60% by weight of the second mixture, the ceramic material in the second mixture comprises from about 25% to about 35% by weight of the second mixture, and the amorphous fumed silica in the second mixture comprises about 15% to 25% by weight of the second mixture.

7. An epoxy composition comprising:
   a first mixture comprising an epoxy resin, an iron particulate, the iron particulate magnetized to create a polarized, electro-magnetic field and one or more additives selected from a group of additives, the group consisting of a ceramic material, an amorphous fumed silica, a silicone, and a color pigment;
   a second mixture for combining with the first mixture, the second mixture comprising an epoxy hardener, an iron particulate, the iron particulate magnetized to create a polarized, electromagnetic field and one or more additives selected from a group of additives, the group consisting of a ceramic material, an amorphous fumed silica, a silicone and a color pigment.

8. The epoxy composition of claim 7 wherein the epoxy resin comprises from about 55% to about 65% by weight of the composition.

9. The epoxy composition of claim 7 wherein the epoxy resin comprises epichlorohydrin bisphenol.

10. The epoxy composition of claim 7 wherein the iron particulate comprises ferrite iron powder.

11. The epoxy composition of claim 7 wherein the ratio of the first mixture to the second mixture is 2:1.

12. The epoxy composition of claim 7 wherein the combination of the first mixture and the second mixture is a cured combination, the curing resulting from heating the combination to at least 150° F.

13. The epoxy composition of claim 7 wherein the first mixture comprises epoxy resin, a ceramic material, an amorphous fumed silica, a silicone, and iron particulate, the iron particulate magnetized to create a polarized, electromagnetic field.

14. The epoxy composition of claim 13 wherein the epoxy resin further comprises a color pigment.

15. The epoxy composition of claim 7 wherein the second mixture comprises an epoxy hardener, a ceramic material, and an amorphous fumed silica.

16. The epoxy composition of claim 15 wherein the second mixture further comprises a silicone, and iron particulate, the iron particulate magnetized to create a polarized, electromagnetic field.

17. A method for producing an epoxy composition comprising:
   a. mixing an epoxy resin, a ceramic material, an amorphous fumed silica, and a silicone;
   b. adding iron particulate to the mixture;
   c. activating an electromagnetic coil within the mixture resulting from step (b) so that the iron particulate is magnetized to create a polarized, electromagnetic field within the mixture;
   d. mixing an epoxy hardener, a ceramic material and an amorphous fumed silica in a separate tank.

18. The method of claim 17 wherein the epoxy resin, ceramic material, amorphous fumed silica, and silicone of step (a) are mixed in a first mixing tank and than added to a second mixing tank, the second mixing tank comprising a color pigment and the iron particulate, the second tank further comprising means for polarizing the iron particulate.

19. The method of claim 17 wherein the polarized epoxy resin mixture resulting from step (a) through step (c) is combined with the epoxy hardener mixture of step (d) and applied to a marine vessel.

20. The method of claim 17 wherein the mixture of the polarized epoxy resin mixture resulting from step (a) through step (c) is combined with the epoxy hardener mixture of step (d) within a polarized spray system.

21. The method of claim 17 wherein the combined mixture of the polarized epoxy resin mixture resulting from step (a) through step (c) and the epoxy hardener mixture of step (d) is cured by heating to at least 150° F.

22. A method for producing an epoxy composition comprising:
   a. mixing an epoxy resin, a ceramic material, an amorphous fumed silica, and a silicone in a first tank using a centrifugal mixer;
   b. transferring the mixture resulting from step (a) to a second tank;
   c. mixing the mixture of step (a) with iron particulate within the second tank and continuing to mix with a centrifugal mixture;
   d. simultaneously activating an electromagnetic coil within the second tank so that the iron particulate is magnetized to create a polarized, electromagnetic field within the mixture;

e. mixing an epoxy hardener, a ceramic material and amorphous fumed silica within a third tank.

23. The method of claim 22 further comprising the step of, upon application, combining the magnetically polarized epoxy resin mixture with the epoxy hardener mixture, mixing the combined epoxy resin mixture and the epoxy hardener mixture and applying the resulting mixed combination to a marine vessel.

24. The method of claim 22 wherein the ratio of the epoxy resin mixture to the epoxy hardener mixture is 2:1.

25. The method of claim 22 further comprising the step of curing the combined epoxy resin mixture and epoxy hardener mixture by heating.

26. A method for producing an epoxy composition for marine applications comprising:
  a. mixing an epoxy resin, an iron particulate and one or more additives selected from a group of additives, the group consisting of a ceramic material, an amorphous fumed silica, a silicone, and a color pigment;
  b. mixing the mixture of step (a) with a centrifugal mixture;
  c. simultaneously activating an electro-magnetic coil within the mixture of step (a) so that the iron particulate is magnetized to create a polarized, electromagnetic field within the mixture;
  d. within a separate tank, mixing an epoxy hardener and an iron particulate magnetized to create a polarized, electro-magnetic field with one or more additives selected from a group of additives, the group consisting of a ceramic material, an amorphous fumed silica, a silicone, and a color pigment and;
  e. upon application, combining the epoxy resin mixture with the epoxy hardener mixture, mixing the combined epoxy resin mixture and the epoxy hardener mixture and applying the resulting mixed combination to a marine vessel.

27. The method of claim 26 wherein the epoxy resin mixture resulting from step (a) through step (d) and the epoxy hardener mixture of step (e) are combined, mixed and applied by a spray system.

* * * * *